United States Patent
Hetzel et al.

(10) Patent No.: US 8,972,609 B2
(45) Date of Patent: Mar. 3, 2015

(54) INTELLIGENT NETWORK INTERFACE CONTROLLER

(75) Inventors: Herbert Hetzel, Schweigen-Rechtenbach (DE); Reiner Klos, Ettlingen-Oberweier (DE); Patrick Heck, Durmersheim (DE); Christian Thiel, Brannenburg (DE)

(73) Assignee: SMSC Europe GmbH, Karlsruhe (DE)

( * ) Notice: Subject to any disclaimer, the term of this patent is extended or adjusted under 35 U.S.C. 154(b) by 2447 days.

(21) Appl. No.: 10/406,983

(22) Filed: Apr. 4, 2003

(65) Prior Publication Data
US 2004/0083310 A1    Apr. 29, 2004

(30) Foreign Application Priority Data
Oct. 29, 2002   (DE) .................. 102 50 536

(51) Int. Cl.
| | |
|---|---|
| G06F 15/173 | (2006.01) |
| H04L 12/437 | (2006.01) |
| H04L 29/06 | (2006.01) |
| H04L 29/14 | (2006.01) |
| H04L 29/08 | (2006.01) |

(52) U.S. Cl.
CPC .............. *H04L 12/437* (2013.01); *H04L 29/06* (2013.01); *H04L 69/40* (2013.01); *H04L 69/32* (2013.01)
USPC ........................................................ 709/250

(58) Field of Classification Search
USPC ........................................................ 709/250
See application file for complete search history.

(56) References Cited

U.S. PATENT DOCUMENTS

| | | | | |
|---|---|---|---|---|
| 4,897,841 A * | 1/1990 | Gang, Jr. ................. | 370/401 |
| 5,802,178 A * | 9/1998 | Holden et al. ............ | 713/151 |
| 5,832,207 A | 11/1998 | Little et al. | |
| 6,199,174 B1 | 3/2001 | Norizuki et al. | |
| 6,457,056 B1 | 9/2002 | Choi | |
| 7,076,787 B2 * | 7/2006 | Cheon et al. ............ | 719/321 |
| 2002/0015442 A1 | 2/2002 | Takeuchi et al. | |
| 2002/0039388 A1 * | 4/2002 | Smart et al. ............ | 375/260 |
| 2002/0141418 A1 * | 10/2002 | Ben-Dor et al. ......... | 370/398 |
| 2003/0229902 A1 | 12/2003 | Moni | |
| 2004/0030949 A1 | 2/2004 | Kopetz et al. | |

FOREIGN PATENT DOCUMENTS

| | | |
|---|---|---|
| JP | 06-309251 | 11/1994 |
| JP | 10-111814 | 4/1998 |
| JP | 11-219327 | 8/1999 |

(Continued)

OTHER PUBLICATIONS

Microsoft comptuer Dictionary 5th edition p. 506.*

(Continued)

*Primary Examiner* — Scott B Christensen
(74) *Attorney, Agent, or Firm* — Kevin L. Daffer; Daffer McDaniel LLP (57) ABSTRACT

A network interface for the secure transmission of data comprises a functionally encapsulated unit that encompasses the elements required to ensure a minimum functionality of the network interface, with access from the outside of said encapsulated unit being possible only via specific shared services. Reliable transmission between nodes of a communication network is ensured by encapsulating a network interface of at least one of the nodes, and by ensuring a minimal functionality of the network interface.

16 Claims, 3 Drawing Sheets

(56) References Cited

FOREIGN PATENT DOCUMENTS

| JP | 2001-223743 | 8/2001 |
|---|---|---|
| JP | 2002-314557 | 10/2002 |
| WO | 98/09213 | 3/1998 |

OTHER PUBLICATIONS

TCP/IP Illustrated vol. 1 The protocols W. Richard Stevens, Chapters 1.1, 1.2, 1.6, 18.2 15.3, 20.8, 17.3, 18.7, 3.8, 15.5, 18.4, & Figures 1.7, 1.2, 26.1, 18.3, 1.3.*
"firmware." Downloaded from <http://web.archive.org/web/20000618215148/whatis.com/firmware.htm >. Oct. 15, 1999.*
"SONET." Downloaded from <http://searchnetworking.techtarget.com/sDefinition/0,,sid7_gci214223,00.html>. Jul. 31, 2001.*
"Computer Glossary," downloaded from <http://www.hard-diskrecovery.net/computer_glossary.html>. 2007.*
"Fault Tolerant Differential CAN-Transceiver," TLE 6254-2G Data Sheet Version 1.1, Infineon Technologies, Dec. 12, 2001, 24 pages.
"10/100/1000 Mb/s PCI Ethernet Network Interface Controller," DP83820 Data Sheet, National Semiconductor, Feb. 2001, 87 pages.
"C167CR C167SR 16-Bit Single-Chip Microcontroller," Data Sheet Version 3.2, Infineon Technologies, Jul. 2001, 74 pages.
Kopetz et al., "The Time-Triggered Architecture," Proceedings of the IEEE Special Issue on Modeling and Design of Embedded Software, Oct. 2002, pp. 1-14.
Tappe et al., "MOST—Media Oriented Systems Transport," Electronik, vol. 14, Jul. 2000, pp. 3-7.
Oasis Siliconsystem, "VideoCompressor 4 MOST," Technical Information, Rev. 3.0, Jul. 2002, 20 pages.
Oasis Siliconsystem, "RadioTuner 4 MOST," V1.0.0, User Manual, Aug. 2003, 90 pages.
Oasis Siliconsystem, "DVDPlayer 4 MOST," V1.2.0, User Manual, Oct. 2003, 96 pages.
Oasis Siliconsystem, "Amplifer 4 MOST," Version 2.0, User Manual, Jul. 2003, 28 pages.
MOST Cooperation, "MOST Specification Framework," Rev. 1.1, 1999, 60 pages.
Austria Microsystems, "TTP/C-C2 Communication Controller," Preliminary Data Sheet, Rev. 1.6, May 2002, 14 pages.
Kopetz et al., "The Transparent Implementation of Fault Tolerance in the Time-Triggered Architecture," Dependable Computing for Critical Applications, Nov. 1999, pp. 191-205.
Bauer et al., "Assumption Coverage Under Different Failure Modes in the Time-Triggered Architecture," Proceedings of the International Conference on Emerging Technologies, 2001, pp. 333-341.
Bauer et al., "Transparent Redundancy in the Time-Triggered Architecture," International Conference on Dependable Systems & Networks, 2000, pp. 5-13.
Xuequan et al., "Application of Embedded TCP/IP Single Chip Microprocessor Technique in Network Communications," Appl. of Electronic Technique, vol. 28, No. 8, 2002, 7 pages.

* cited by examiner

INTELLIGENT NETWORK INTERFACE CONTROLLER

BACKGROUND OF THE INVENTION

1. Field of the Invention

The present invention relates to a network interface as well as to a network and a method of creating a network for secure data transmission.

2. Description of Related Art

There is a plurality of different types of communication networks for different applications. In correspondence therewith, the demands on transmission reliability and robustness in transmission vary. For the transmission of e-mails, for example, the demands on the network may be comparatively low. In cases of networks employed for the transmission of safety-relevant data, e.g. in motor vehicles, by contrast, maximum demands are made on the networks. To ensure a high reliability in transmission, both the hardware and the software of the network must be appropriately designed.

The explanations set forth below relate, inter alia, to the OSI reference model (basic reference model "open systems interconnection") according to ISO. In that model, communication architectures are subdivided into seven layers. In correspondence with these layers, different measures are known for ensuring a defined reliability in transmission. The following specification refers to the term "layer" also in the sense of the meanings of entities of the layer.

For example, the data sheet TLE 6254-2G of Apr. 30, 2002, published by Infineon Technologies AG, Muenchen, discloses a "Fault Tolerant Differential CAN-Transceiver." This transceiver detects different fault conditions of the lines used for signal transmission and controls faultless lines, if possible, in such a way that signals can still be transmitted via these lines.

FIG. 6 of the TLE 6254-26 data sheet illustrates a CAN transceiver controlled by means of a microprocessor with an integrated CAN module. This arrangement presents the advantage, that in the case of faults or malfunction in the line system signal, transmission is still possible in many cases. However, provisions are not envisioned here for protection from errors in the software of the microprocessor. When, for example, the microprocessor is loaded or overloaded, respectively, by the execution of application services in such a way that it can no longer respond to the bus signals, a communication via the bus is no longer possible.

The effects of errors affecting the transmission of the bus system as a whole are far more serious. This may be the case, for example, when in the case of a fault a continuous data stream is output onto the bus, which does not comply with the standard. Such a data stream could be created, for instance, by an incorrect behaviour of the microprocessor controlling the CAN transceiver. When the bus is blocked by such a data stream, other nodes can no longer communicate with each other. When the error case of microprocessor overload, which has been described first, only affects on node, it is possible that a fault described in the second case blocks a complete bus system and results in the failure of essential functionalities of the system. Such a condition is not acceptable, specifically in applications critical in terms of security of, for example, applications in motor vehicles.

For a reduction of such faults to an acceptable level it is necessary to test the entire software of the microprocessor exhaustively. In this test, not only the function relevant for the communication via the bus but also all other functions must be tested. This is necessary because each code in the microprocessor has access to the hardware functions of the bus or may at least result in failure of the bus service on account of microprocessor overload. Particularly in complex networks including a plurality of different nodes, this results in a problem that can hardly be solved because in the test all conceivable conditions of all nodes should to be taken into account. In practical application, this leads to the execution of tests on the basis of simplifying assumptions. Yet, a high test complexity remains with an unsatisfactory result.

The data sheet "C167CR, C167SR 16-bit Single-Chip Microcontroller," July 2001 of Infineon Technologies AG, Muenchen, describes a typical micro controller with an integrated CAN interface by way of an example. This interface comprises a CAN module that is capable of emitting or receiving data independently. As is apparent from Table 7 of this data sheet, the CAN module is directly mapped into the linear address space of the micro controller. As a result, any element of the code whatsoever can—intentionally or unintentionally—have access to this code. Errors in computation are particularly critical in indirect addressing, for example. As in this case, the CAN module is located in the linear address space such that an addressing error could result in a fault on the bus in its entirety. When, for example, the bus cycle is unintentionally modified the supply of data with an incorrect cycle frequency may cause a breakdown of the communication throughout the bus system in its entirety.

Another case of a possible failure occurs when, for example, a reset of a node, including the network interface, is triggered due to a fault in an application or by a user, respectively. Here, the node loses its network connection and must be re-synchronized to the network. Specifically in the case of networks with a ring architecture, this may lead to a failure of the transmission for the time of the booting cycle up to a new synchronization. As these operations may last often for several seconds up to minutes, such a failure of a complete network, e.g. a network used in motor vehicles, is unacceptable. When, as a consequence of a fault in hardware or software associated to a node, this booting operation is no longer possible, this situation may result in a permanent impairment or in a total failure of the network.

The problems described here by the example of a CAN bus occur, of course, also in the other known bus systems. One example for Ethernet is specified in the data sheet "DP83820 10/100/100 MB/s PCI Ethernet Network Interface Controller," February 2001, National Semiconductor Corporation. There, a network interface controller is described that is mapped by means of an integrated PCI bus interface directly into the linear address space of a microprocessor.

U.S. Pat. No. 6,457,056 discloses a network interface controller to which a microprocessor may have access directly via the system bus. This results in the same problems, too, as those occurring in the aforedescribed case of the CAN interface.

In an approach to improve the reliability of computer systems fundamentally certain operating systems are provided with a so-called "protected mode" for essential parts of the core of the operating system. As in this approach, drivers are incorporated for the entire hardware of a computer system causing the operating system core to be large and, hence, error-prone. When a fault occurs within this core, for instance, due to errors in the software or as a result of faults in any hardware component, this fault may lead to the consequence that the network interface is no longer controlled. Again, this may result in the above-described faults in the entire system interconnected by the network. Moreover, in these operating systems, a subdivision is made between the parts executed in the protected mode and the remaining part primarily under the aspect of simple programming interfaces and less under the aspect of security. For example, only the driver for the hardware is protected in the protected mode for conventional network connections of PCs whereas other essential functionalities such as the TCP IP stack are implemented in the operating system in a conventional manner.

SUMMARY OF THE INVENTION

The invention is based on the problem of designing a network or the associated network interfaces, respectively, in such a manner that a high level of transmission reliability and robustness of the bus system as a whole will be achieved at a minimum of expenditure in testing. One inventive solution to this problem is defined in the appended claims. Improvements of the invention are set forth also in the appended claims.

An inventive network interface comprises a functionally encapsulated unit that encompasses the elements required to protect a minimum functionality of the network interface. Access to the interface from the outside of the encapsulated unit is possible only via specific accessible services. Access via other services or even directly to the hardware of the network interface are not possible.

Due to this restriction of the access, the stability of a bus system composed of inventive network interfaces is determined exclusively by the encapsulated components of the network interfaces. It is hence now possible to develop and to test the hardware or software, respectively, within the encapsulated unit. The complexity of the tests is substantially lower than in conventional systems because the effects created by the parent layer, such as those of the applications, need no longer or only conditionally be considered. Due to the encapsulation, they can now no longer have direct access to subordinate layers and can hence no longer produce negative influence on the communication of the network. In applications corresponding to the examples described above in the discussion of prior art, a register for controlling the data rate of the network will certainly be located within the encapsulated zone in accordance with the present invention as a direct access to this register would endanger the function of the entire network.

Moreover, the encapsulated unit as such is able to operate in a self-supporting manner and is hence able to maintain the required network functions even without interaction with a connected device.

Encapsulation can be achieved, for instance, by means of the appropriate hardware. One example of this is an integrated network interface controller including the components of the Layer 1 (physical layer) and the components of the Layer 2 (data link), with the possibility to have access to the entities of the services in layer 2 from the outside via an external microcontroller. Here, any other layer up to layer 7 could apply, of course.

It is equally possible that encapsulation is realized, for example, within a micro controller in which a network interface controller is mapped into the linear address space, by means of a "protected mode." This inventive protected mode should not be confused with the protected modes known from prior art which encompass, as a rule, major parts of the operating system and particularly all the hardware drivers as well. The inventive protected mode relates exclusively to the network; preferably, it does not include any other components, specifically hardware drivers. Here, access to the network interface controller is possible only in the protected mode. To this end, the entities of the layers are implemented in this protected mode within the encapsulated unit. Access to the network interface controller from the remaining parts of the code is not possible. The term "encapsulation" here also encompasses the provision of resources for real-time service of the network interface. This means that corresponding interrupts can be executed in this protected mode, too, or that corresponding time slices are available for the execution of the protected mode.

On principle, the essential operations critical in terms of real-time, such as data reception, data check for correctness, hand-shaking procedure or also the requests for retransmissions in cases of error, are executed within the encapsulated unit. As the real-time capabilities are protected, a substantially higher data throughput can be achieved. For example, it is possible that an integrated network interface controller integrating all these functions already can forward complete, correctly received large data packages to a connected host controller via a high-speed interface or receive such packages from the host.

The encapsulated unit as such may be designed to meet the respective requirements. For example, those elements of the hardware and software, which are required to maintain the functionality of the network interface, are expediently included into the encapsulated unit. This may mean, for instance, that the entire hardware (OSI Layer 1), parts of layers 2, 3, 4, possibly up to parts of layer 7 are also included. Other parts of these layers, however, may also be located outside the encapsulated unit in correspondence with the respective applications.

In a particularly expedient embodiment of the invention, the encapsulated unit extends here from a lower OSI Layer M up to a subset of an upper OSI Layer N, with N>M. The lower layer is here the lowermost layer necessary for data transport. The upper layer N may be identical with layer M, but is preferably higher than layer M. Hence, the encapsulated unit encompasses at least one, preferably, several layers. Access from the outside of the encapsulated unit is possible exclusively via the entities of the services of the uppermost layer N.

According to another advantageous embodiment of the invention, in cases where a layer 1 (physical layer) is provided, the encapsulated unit begins with this layer M=1 and extends up to a predetermined subset of an upper layer N≥2. A combination of the layers 1 and 2 as well as of further optional layers is particularly sensible because a sufficiently secured data communication is possible only in a combination with these layers.

Another embodiment of the invention relates to the transmission of synchronous streams. These are used, for instance, to transmit multimedia data in real-time among various subscribers. The management of these synchronous streams is real-time sensitive and requires a specific handling of the network traffic. Particularly in the case of at least logic ring networks, here maximum demands on each network node apply because also network nodes with applications involving comparatively low demands on the data volumes to be transmitted or on real-time capabilities must be able to transfer these streams and ensure their correct routing. In order to achieve here a special protection from undesired malfunction, their incorporation into the encapsulated unit is envisioned.

A further embodiment of the invention consists in the provision of additional monitoring and control functions within the encapsulated unit. Such functions permit, on the one hand, the monitoring of the interface with parent layers in an approach to avoid malfunction by erroneous procedure calls or incorrect parameters, respectively. On the other hand, these monitoring and control functions permit the control of the entities in the encapsulated unit. For example, it is possible to monitor the physical network connection. Additionally, the functions of parent entities can also be controlled. For instance, the failure of functions can be detected in parent entities and, as a consequence, an operating mode can be activated for emergency operation of the network functions.

A provision such as a watchdog timer is suitable to monitor the functions in parent entities. In normal operation, this timer is triggered by regular actions or calls from parent entities. When this timer does no longer receive trigger signals due to the failure of functions in parent entities it triggers an emergency mode for the network functions. As soon as the functions of the parent entities are available again, they trigger the watchdog timer again whereupon the latter now deactivates the emergency operation.

According to another embodiment of the invention, the additional monitoring and control functions are designed for safeguarding a predetermined basic functionality. This basic functionality permits a communication with the network interface even when the hardware and software components connected to or communicating with the encapsulated unit do not operate at all, or do not operate correctly. For example, this basic functionality permits a functional diagnosis of the network interface or of the device connected to it. It is likewise possible to trigger a selective start-up or shut-down of the bus system in this manner, for example.

In a further embodiment of the invention, a function is designed for forwarding packages within the encapsulated unit, preferably for the application in networks having at least one logic ring structure. With this provision, it is possible to forward the data packages even in the case of a defective or overloaded micro-controller, or a micro-controller suffering from other types of malfunction. The functionality of the network is not impaired by malfunction in individual nodes because the nodes are still capable of forwarding received data packages in the ring.

Another embodiment of the invention provides for a function within the encapsulated unit, which may be used to enable a reset of the components or functions, respectively, within the encapsulated unit. The reset is triggered by means of a command that is transmitted via the network. As a result, the network components can be reset into a defined initial condition again.

According to a further embodiment of the invention, the encapsulated unit comprises additional means for signalling a reset to external components. Signalling can be implemented optionally by hardware, for example by means of a signalling line, or also by software, for example by means of flags, messages, etc. On principle, various levels may also be provided in the case of a reset. For instance, a reset could be signalled to a specified part of a connected device by means of software, while in the case of a serious malfunction, a complete reset is signalled by a hardware line. Here, too, the reset could be triggered, for example, by a command communicated via the network.

Another embodiment of the invention provides for an additional monitoring means for the optional monitoring of the functions of the encapsulated unit, of the network traffic or of the functions of individual nodes. Such a monitoring means is expediently provided in the encapsulated unit of a node even though it may also be provided in several nodes. When the data traffic or the behaviour of individual nodes is incorrect the additional monitoring means optionally emits a command to reset an individual node, the devices connected to it, or even the entire system connected to the network. In correspondence with the detected error of the detected malfunction, the encapsulated unit also resets itself. Optionally, an error message or a report of the actions is stored in a memory, or is communicated to one or several nodes in the network. An appropriate software or also a watchdog timer may be used for monitoring.

Another embodiment of the invention provides for means for monitoring the components outside the encapsulated unit. For example, the network interface can monitor an application in terms of its function. As the network interface ensures a secure operation capable of real-time operation, it is also possible to check a correct functional integrity or the compliance with specified requirements such as response time from this network interface. When the requirements are not met, this condition can be signalled to the corresponding components (hardware or software). This design permits not only a fault-tolerant operation but also particularly simple debugging. This condition can equally be signalled to other network nodes or a central monitoring unit. The malfunctioning components may be reset optionally. It is not necessary to reset the entire system but it is often rather sufficient to reset only the malfunctioning components. Such a reset may also be carried out in several stages in correspondence with the fault or the respective component.

According to another expedient embodiment of the invention, the encapsulated unit is integrated as a component into a system. Here, the hardware components of the encapsulated unit, which are required to maintain a basic functionality, are optionally provided with a separate power supply that operates independently of the power supply of the remaining parts of the system. In the case of a ring bus, for example, it is hence possible to forward packages even when the system is deactivated because the encapsulated unit, which comprises at least a subset of layers 1 and 2, includes a separate power supply and can, hence, operate independently of the remaining parts of the system.

In another expedient embodiment of the invention, an optical bus is employed for data transmission. In this case, the encapsulated unit is so designed that it comprises the optical components and serves to control exclusively the optical transmitter. In this manner, the encapsulated unit serves not only for control of the optical output signals but also for activation of the optical transmitter as such. It is therefore possible, for example, to turn off the transmitter during pauses in order to save energy. If the transmitter would be activated or deactivated by a separate control circuit it would not be possible, e.g. in the case of a ring bus, to ensure the transfer of the packages.

In a further advantageous embodiment of the invention, the encapsulated unit comprises a message-controlled interface. This control by messages constitutes a mechanism that is substantially more robust and more reliable than the corresponding control by registers so far employed in prior art for control of the network interface controller. Apart therefrom, this kind of signalling is consistent with the mechanisms of advanced operating systems.

According to another expedient embodiment of the invention, the encapsulated unit includes an object-oriented interface. In accordance with the invention, access is possible only to shared objects. In such an object-oriented interface, the network interface as such may even be represented as functional objects.

A further expedient embodiment of the invention provides for a re-configuration or for re-programming of the network interface controller or parts thereof via the network. It is thus possible, at option, to load new operating parameters as well as the code of firmware or software via the network and to store these in a re-writable memory (Flash PROM). This operation may optionally be performed also via a broadcast for simultaneous programming of several nodes.

An inventive network node comprises a network controller that includes a functionally encapsulated unit containing all the elements required to ensure a minimum functionality of the network interface. With such a design, access from the outside of the encapsulated unit is possible exclusively via specific shared services. The network node may comprise any applications whatsoever in terms of hardware and software, such as the PC, a radio, a monitor, a DVD player or even only the controller for simple components such as an electric window winder or lighting devices, in addition to the network controller.

In accordance with the invention, a network for connecting at least two nodes comprises at least one node with a functionally encapsulated unit. This functionally encapsulated unit encompasses all the elements required to ensure a minimum functionality of the network interface, with access from the outside of the encapsulated unit being possible exclusively via specific shared services.

An inventive method of generating a network for secure connection among several nodes comprises the combination of several nodes to form a network and in encapsulating the network interface of at least one node in such a way that all elements required to ensure a minimum functionality of the network interface will be included and that access from the outside of the encapsulated unit is exclusively possible via specific shared services. For the inventive generation of a reliable network it is also possible to interchange the sequence of the first two steps of the method.

BRIEF DESCRIPTION OF THE DRAWINGS

In the following, the present invention will be described in an exemplary form by embodiments, without any limitation of the general inventive idea, with reference to the drawings wherein.

DETAILED DESCRIPTION OF PREFERRED EMBODIMENTS

Figure 1:
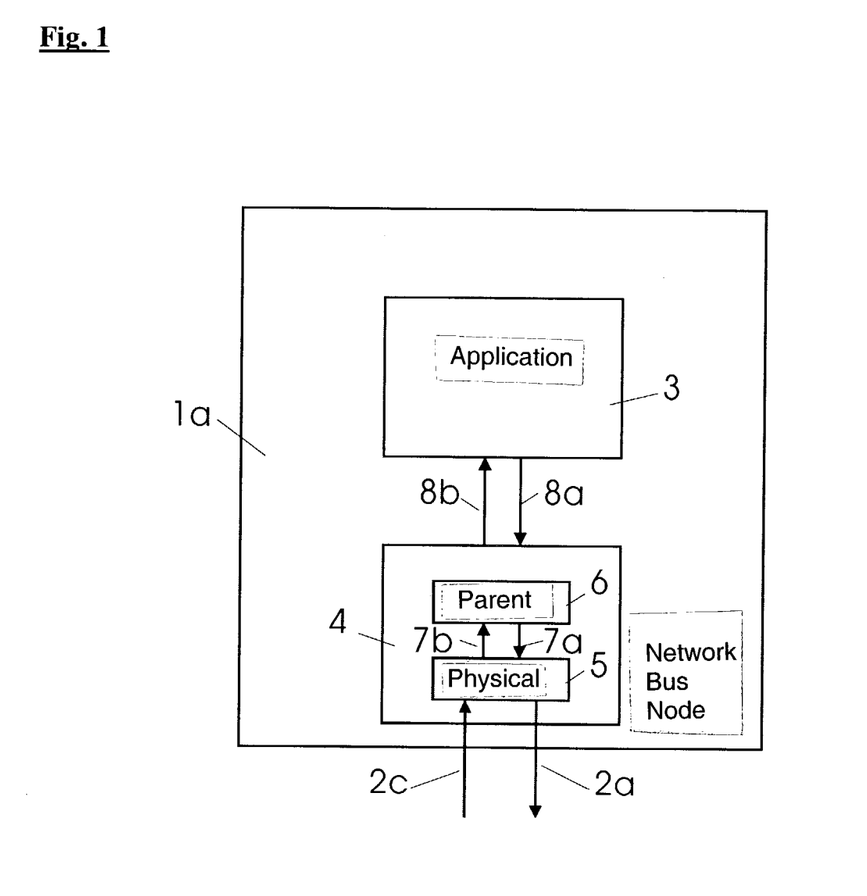
FIG. 1 is a general schematic view of an inventive device.

FIG. 1 illustrates a schematic view of an inventive system. A bus node 1a comprises connections 2a and 2c for communication with other bus nodes. The communication may be implemented, for instance, via optical and also electric connections or even by means of radio connections. At the site of the two sketched unidirectional connections a bi-directional connection is equally conceivable.

Moreover, the bus node comprises an encapsulated unit 4 as well as an application 3. The application is here representative of a great number of different functionalities of the bus node. This general term "application" may include also subordinate layers, in addition to the respective OSI layer of the application layer, which, however, rank higher than the layers provided in the encapsulated unit. For example, the application in the sense used here may be a car radio, an amplifier, a communication system, a brake system, etc.

The encapsulated unit 4 comprises a physical layer 5 that includes the communication hardware for the physical connection to other bus nodes. Moreover, the encapsulated unit includes parent elements 6, preferably formed by parent layers. These layers may originate, for instance, from the OSI layer 2 or 3. They may include, for example, the functions for managing data rates, fault detection, flow control, etc. The communication of the parent elements 6 with the elements of the physical layer 5 is established via the internal communication routes 7a and 7b. Communication of the application 3 is exclusively possible via the external communication routes 8a and 8b via specific interfaces with the encapsulated unit 4. Direct communication, for instance with the physical layer, is not possible, however.

A practical implementation of the encapsulated unit 4 could consist, for instance, in a self-contained network interface controller that presents outbound connections 2a and 2b for communication with other nodes as well as outbound connections 8a and 8b for communication with the application.

Figure 2:
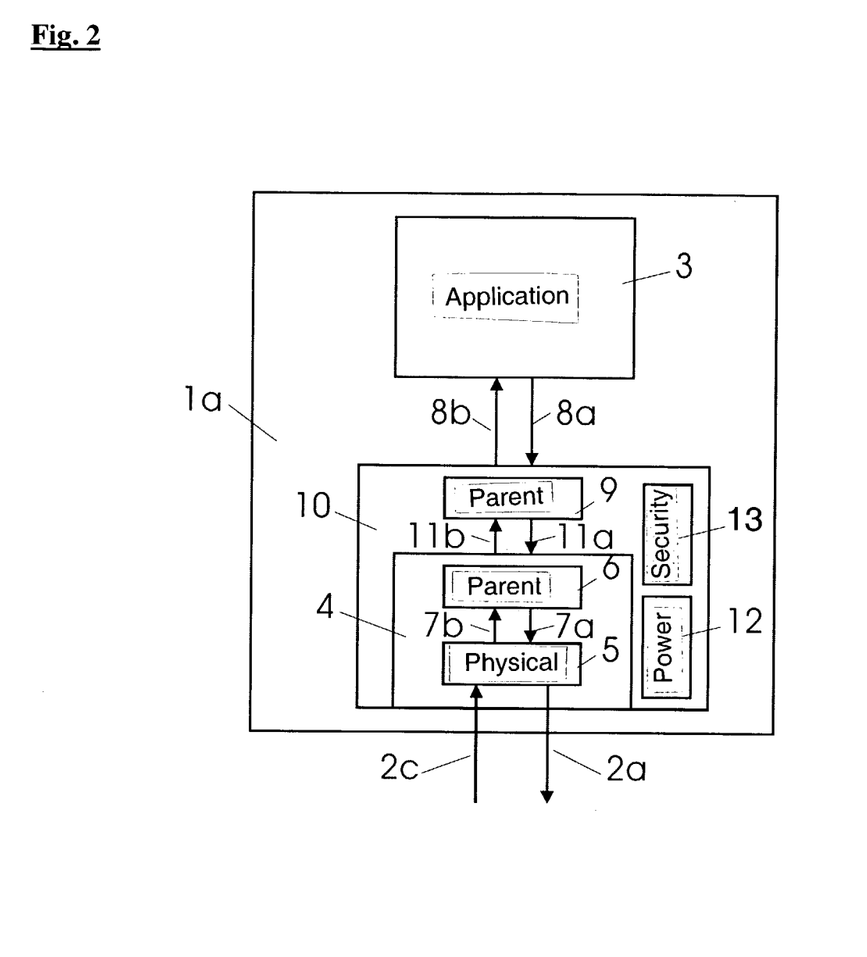
FIG. 2 illustrates a schematic of a special complex embodiment of the invention.

FIG. 2 is a schematic illustration of a particularly complex embodiment of the invention. Here, first of all, the same components as those elements are present, which appear with the corresponding identical reference numerals in FIG. 1. Moreover, an additional parent encapsulation 10 is provided. The latter encompasses the encapsulated unit 4 as well as an additional layer 9 in parent relationship with it. This parent layer 9 communicates with the encapsulated unit 4 by means of the communication routes 11a and 11b. The hierarchic encapsulation concept furnishes an increased reliability and security from failure. It could be possible, for example, to implement the interior encapsulated unit 4 as separate hardware element and the parent encapsulation for instance in the form of a protected mode within a micro-controller that runs also the application. It could equally be possible, however, to implement the encapsulated unit 4 by software, for example by means of a protected mode within a common micro-controller.

For illustration of additional means, a power supply 12 is also provided that continues the power supply of the network components, e.g. in the case of a breakdown of the power supply of the remaining parts of the system, thus maintaining the network functionality. This power supply may be controlled, for example, by components of the parent encapsulation 10 to switch the network interface to a stand-by mode. In accordance with their definition, the elements outside this encapsulation do not have access to the power supply. Additionally, security means 13 are provided for monitoring the activities within the parent encapsulation, e.g. in a manner comparable to the operation of a watchdog timer.

Figure 3:
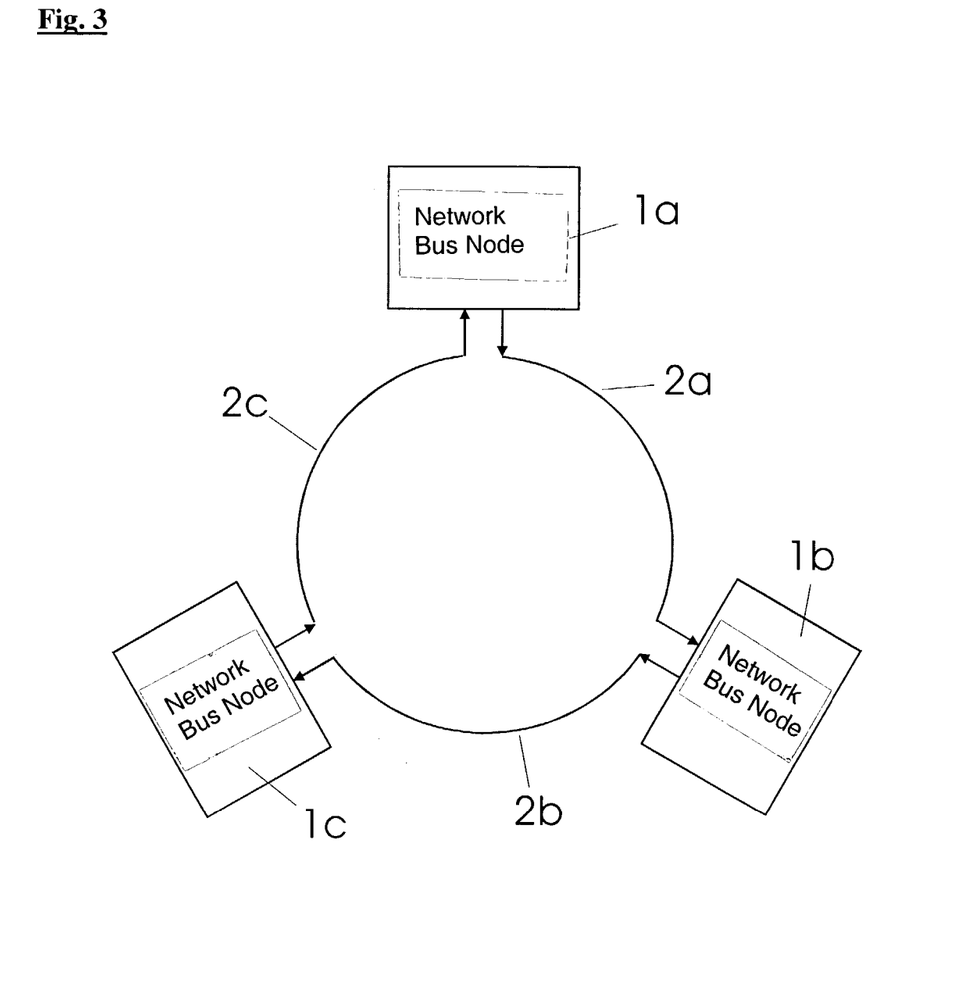
FIG. 3 explains the invention by the example of a ring bus.

FIG. 3 shows the combination of several nodes in the form of a ring bus. The individual nodes 1a-c communicate via the connections 2a-c connected to form a ring. In this manner, the first node 1a may transmit information via the first connection 2a to the second node 1b. The latter can transmit information via the second connection 2b to the third node 1c. The circular loop is closed by the third connection 2c between the third node and the first node. When, for instance, the second node 1b is overloaded by its application to such an extent that it cannot transfer data packages from the first node to the third node the logic connection between the first node and the third node is also interrupted. By an inventive encapsulation in the network interface, the second node is now as before in the position to forward the data packages from the first node to the third node. As a consequence, an overload on the second node, which is due to the application, does not at all affect the transmission of the data on the bus.

What is claimed is:

1. A network interface within a network node, the network interface comprising:

a functionally encapsulated unit of hardware containing all hardware components of which are necessary to maintain functionality of the network interface, having a microcontroller for addressing software within a storage medium executable by said hardware, and containing a protected address space;

wherein the functionally encapsulated unit encapsulates a physical layer of the network node and extends up to a parent layer of the network node, wherein the physical layer provides network services of an OSI layer 1, wherein the parent layer provides network services of a predetermined subset of an OSI layer N, where N>1, and wherein network services of any OSI layers located outside of the functionally encapsulated unit are provided by the network node;

wherein, during operation, the functionally encapsulated unit maintains the functionality of the network interface even when hardware components external to the functionally encapsulated unit, but within the network node, are inoperable by encapsulating the physical layer up to the parent layer; and wherein said functionally encapsulated unit is accessible:
from outside the network node by other network nodes using a physical connection to the physical layer of the functionally encapsulated unit;
from inside of the network node by the hardware components external to the functionally encapsulated unit using a connection to the parent layer of the functionally encapsulated unit, wherein said connection to the parent layer provides accessibility exclusively to services of said OSI layer N and prevents direct access to said OSI layer 1; and
via a power supply coupled to only those hardware components of the encapsulated unit which are necessary to maintain the functionality of the network interface, wherein said power supply is independent of a universal power supply coupled to the hardware components of the network node which are external to the functionally encapsulated unit.

2. The network interface according to claim 1, wherein said functionally encapsulated unit comprises all layers between the OSI layer 1 and a predetermined subset of an OSI layer N≥2.

3. The network interface according to claim 1, wherein functions for managing a synchronous stream comprise the microcontroller executable on the protected address space of a network interface controller, and are incorporated into said functionally encapsulated unit.

4. The network interface according to claim 1, wherein additional monitoring and control functions comprise the microcontroller executable on the protected address space of a network interface controller, and are provided within said functionally encapsulated unit.

5. The network interface according to claim 1, wherein additional monitoring and control functions are provided within said functionally encapsulated unit, and said additional monitoring and control functions comprise a power supply and security means usable only by said functionally encapsulated unit to ensure a predetermined functionality even when hardware or software components connected to or communicating with said functionally encapsulated unit are not operative or do not operate correctly.

6. The network interface according to claim 1, wherein a function for forwarding or routing packets, preferably for application in networks with at least one logic ring structure, is provided within said functionally encapsulated unit.

7. The network interface according to claim 1, wherein a function is provided within said functionally encapsulated unit, which permits a reset of the components or functions within said functionally encapsulated unit via a command transmitted via a network.

8. The network interface according to claim 1, wherein a function is provided within said functionally encapsulated unit, which permits a reset of the components or functions within said functionally encapsulated unit via a command transmitted via a network, and said functionally encapsulated unit is connected to components external to the functionally encapsulated unit, and wherein means are provided for signaling said reset to the external components by hardware or software.

9. The network interface according to claim 1, wherein at least one monitoring means is additionally provided within said functionally encapsulated unit for monitoring network traffic between nodes or functionality of the nodes, and detecting malfunctions therein, said monitoring means comprises the microcontroller executable upon the protected address space of a network interface controller for sending in a case of detected malfunctions selective commands for resetting individually one or several of said nodes, devices connected to said nodes, or an entire system connected via a network.

10. The network interface according to claim 1, wherein at least one monitoring means is additionally provided within said functionally encapsulated unit for monitoring functions or specified operating parameters of components outside of said functionally encapsulated unit and detecting malfunctions therein, said monitoring means signaling a detected malfunction and optionally resetting at least one of said components.

11. The network interface according to claim 1, wherein said functionally encapsulated unit is integrated as a single component into a device, and wherein all hardware components of said functionally encapsulated unit which are necessary to maintain functionality, specifically the components of the OSI layer 1 up to OSI layer N, are connected to the power supply that is independent of the universal power supply provided to other hardware components of OSI layer N+1 or greater.

12. The network interface according to claim 1, wherein an optical bus is provided for transmission of data, and wherein said functionally encapsulated unit is the sole control means for controlling an optical transmitter.

13. The network interface according to claim 1, wherein said functionally encapsulated unit comprises a message-controlled interface.

14. The network interface according to claim 1, wherein said functionally encapsulated unit comprises an object-oriented interface.

15. The network interface according to claim 1, wherein firmware or software of said functionally encapsulated unit is re-programmable via the network and storable in memories.

16. A network interface within a network node, the network interface comprising:
a functionally encapsulated unit of hardware containing all hardware components of which are necessary to maintain functionality of the network interface, having a microcontroller for addressing software within a storage medium executable by said hardware, and containing a protected address space;
wherein the functionally encapsulated unit encapsulates a physical layer of the network node and extends up to a parent layer of the network node, wherein the physical layer provides network services of an OSI layer 1, wherein the parent layer provides network services of a predetermined subset of of an OSI layer N, where N>1, and wherein network services of any OSI layers located outside of the functionally encapsulated unit are provided by the network node;

wherein, during operation, the functionally encapsulated unit maintains the functionality of the network interface even when hardware components external to the functionally encapsulated unit, but within the network node, are inoperable by encapsulating the physical layer up to the parent layer; and wherein said functionally encapsulated unit is accessible:
- from outside the network node by other network nodes using a physical connection to the physical layer of the functionally encapsulated unit;
- from inside of the network node by hardware components external to the functionally encapsulated unit exclusively via specific shared services, which prevents the hardware components external to the functionally encapsulated unit from directly accessing the OSI layer 1; and
- via a power supply coupled to only those hardware components of the encapsulated unit which are necessary to maintain the functionality of the network interface, wherein said power supply is independent of a universal power supply coupled to the hardware components of the network node exclusive of only those hardware components necessary to maintain functionality of the network node.

* * * * *